FIG. 2

July 29, 1969    R. L. TEST ET AL    3,457,881
WASTE CHEMICAL DISPOSAL APPARATUS AND PROCESS
Filed Dec. 1, 1967    5 Sheets-Sheet 5
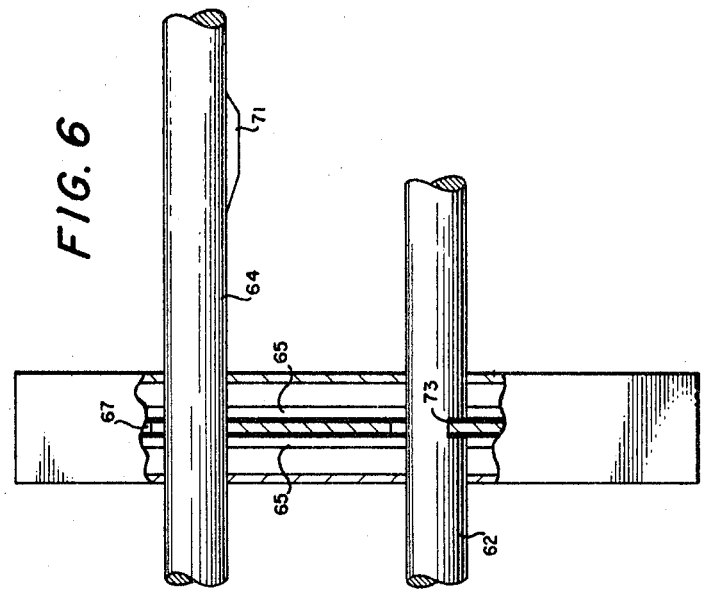
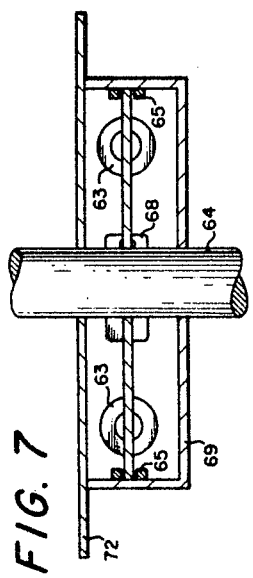
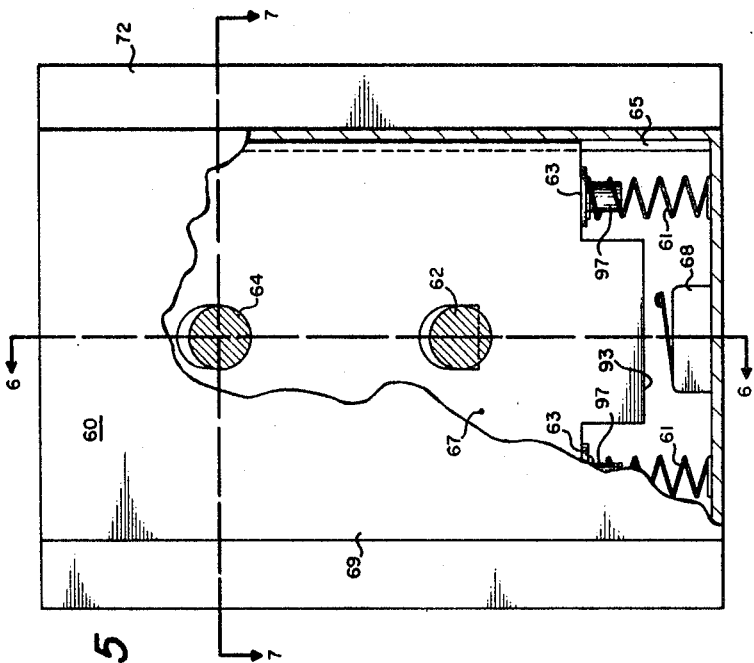
INVENTORS
ROBERT L. TEST
HAYWARD R. BAKER
RAYMOND G. NEBELUNG
BY
ATTORNEY

United States Patent Office 3,457,881
Patented July 29, 1969

3,457,881
WASTE CHEMICAL DISPOSAL APPARATUS AND PROCESS
Robert L. Test, Camp Springs, and Hayward R. Baker, Silver Spring, Md., and Raymond G. Nebelung, Washington, D.C., assignors to the United States of America as represented by the Secretary of the Navy
Filed Dec. 1, 1967, Ser. No. 687,330
Int. Cl. F23b 1/38; F23g 7/06
U.S. Cl. 110—7
12 Claims

ABSTRACT OF THE DISCLOSURE

Apparatus and process for treating solid, liquid and gaseous chemical waste without contamination of the surrounding environment. The waste disposal apparatus consists of crushers to grind and receivers to collect solid and liquid waste material, an incinerator to burn the material, a secondary incinerator to reduce soot in the combustion gases, neutralization means to neutralize acidic combustion compounds, a scrubber to remove entrained and soluble material from the combustion gases and a stack to further reduce contamination. All waste process water is treated in a liquid effluent system and neutralized before discharge to the sewer. The entire system is provided with safety devices to prevent injury in case of explosion.

The invention described herein may be manufactured and used by or for the Government of the United States of America for governmental purposes without the payment of any royalties thereon or therefor.

BACKGROUND OF THE INVENTION

Field of the invention

This invention relates to the disposal of waste material and more particularly to disposal of solid, liquid or gaseous laboratory chemical waste by incineration.

Description of the prior art

Disposal of any waste material gives rise to problems of air, land and water pollution. Chemical waste disposal involves a further serious health problem due to the explosive, volatile and toxic properties of many chemicals.

Many materials which are flammable are conventionally disposed of by open field burning. However, combustion is usually incomplete resulting in the smoke containing large amounts of unburned carbonaceous materials and appreciable amounts of irritant and toxic materials. Such smoke not only creates a severe soot nuisance in the neighborhood of the disposal facility but further creates environment health hazards to livestock, vegetation and residents of the area.

Many materials are disposed of by discharge to sewers or available waterways. However, care is needed to avoid flammable conditions in dosed areas such as sewers. Also stream pollution problems are always present endangering wildlife.

Still other materials are disposed of by burying or land fill operations. However, water soluble materials may leach into streams and wells to create a hazardous situation. Furthermore, suitable areas for land fill are not always available for large scale disposal in a convenient, readily accessible, local area.

Many harmless wastes such as paper are conventionally burned in incinerators. While burning in incinerators under proper control can minimize smoke nuisance, the hazards created by flammable liquids and vapors are quite serious. Chemical incinerators require good design with provisions to guard against the hazards of explosion and contamination of the environment with toxic materials.

SUMMARY

The chemical waste disposal apparatus of this invention gives complete and safe disposal of most laboratory volatile and toxic waste in one facility. Contamination of the environment due to discharge of hazardous combustion products is prevented by optimum combustion, by neutralization of acidic materials produced from burning chemicals, for example halogenated hydrocarbons, and by removing entrained solid materials. In addition all waste water is neutralized prior to discharge to sewer and waterways in a liquid effluent system. Combustible materials collected from the incinerator ash pit and all precipitates collected from the liquid effluent systems are periodically hauled away to a suitable land fill.

It is an object of the present invention to provide a complete waste disposal system for laboratory waste which prevents environmental contamination.

Another object is to provide a safe disposal facility for flammable and toxic chemical materials.

A further object of the invention is to provide a chemical incinerator with a secondary burner and neutralization means and a scrubber unit to reduce air contamination.

Still another object is to provide a facility for safely removing chemicals from paper, glass, metal and other containers and collecting their contents for disposal in an incinerator.

Yet another object of the present invention is the provision of a holding tank and dilution box to prevent contamination of streams and waterways.

A still further object is to provide a novel safety interlock device which prevents flashback when flammable and explosive materials are charged to an incinerator.

BRIEF DESCRIPTION OF THE DRAWINGS

Other objects and many of the attendant advantages of this invention will be readily appreciated as the same becomes understood by reference to the following detailed description when considered in connection with the accompanying drawings in which like reference numerals designate like parts throughout the figures thereof and wherein:

FIG. 2 shows a side elevation view, partially cut away, of a preferred incinerator embodiment;

FIG. 5 is a front view, partially cut away, of the preferred safety interlock device employed in this invention to prevent flame and explosion flashback during loading of the incinerator;

FIG. 6 shows a section of the device taken on the line 6—6 of FIG. 5 looking in the direction of the arrow;

FIG. 7 shows a section of the device taken on the line 7—7 of FIG. 5 looking in the direction of the arrows.

DESCRIPTION OF THE PREFERRED EMBODIMENT

Figure 1:
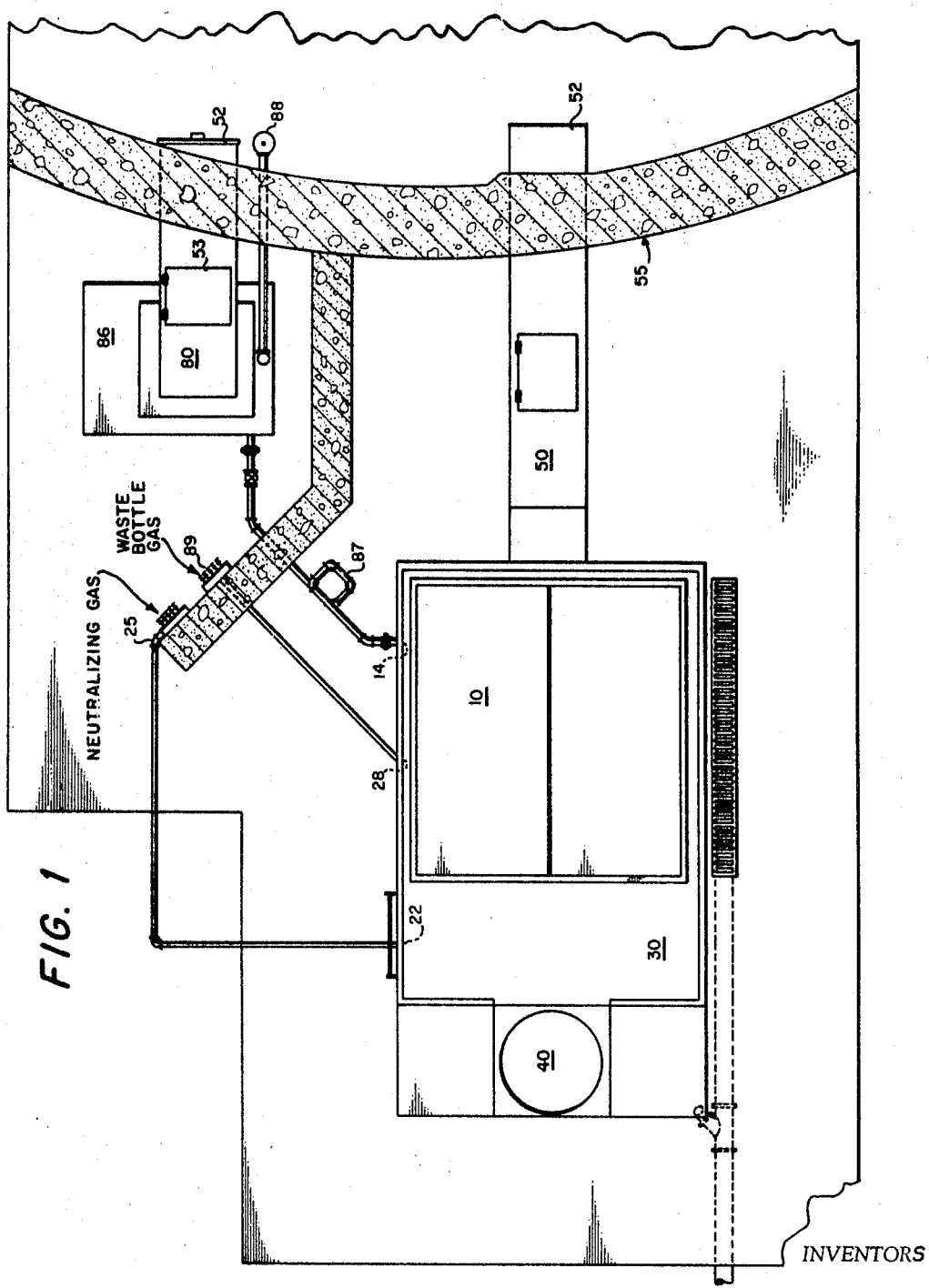
FIG. 1 is a top view of the chemical waste disposal facility of this invention.

Referring now to the drawings, FIG. 1 is a top view of the waste disposal facility of this invention. The facility consists of a concrete or other suitable explosion barrier 55 through which waste material is charged to the disposal equipment.

Solid wastes including containers having solid chemical waste are charged to the incinerator 10 through the material admitting device 50. Gas fired burners, in the incinerator, consume the waste. Gaseous and entrained materials are further treated in the incinerators after burner (not shown), scubber 30 and stack 40 before discharge to the atmosphere.

Liquid wastes are charged to a waste liquid unit 80 where a bottle breaker or crusher frees waste liquid which is collected in receiver tank 86. The broken containers are collected and charged to incinerator 10. A receiver 88 is provided for draining waste solvent from containers too large to be treated by unit 80. Waste liquid stored in tank 86 is transferred through lines 87 to the incinerator opening 14 for burning. A flashback loop is provided in line 87 for safety. Waste bottled gas is charged to the incinerator opening 28 from manifold 89.

A neutralizer manifold 25 is provided for supplying neutralizing gas to opening 22 of the scrubber 30.

The drain system for handling water draining from the scrubber 30 and stack 40 and other sources, such as washdown water is only partially shown and will be explained in more detail later.

Figure 2:
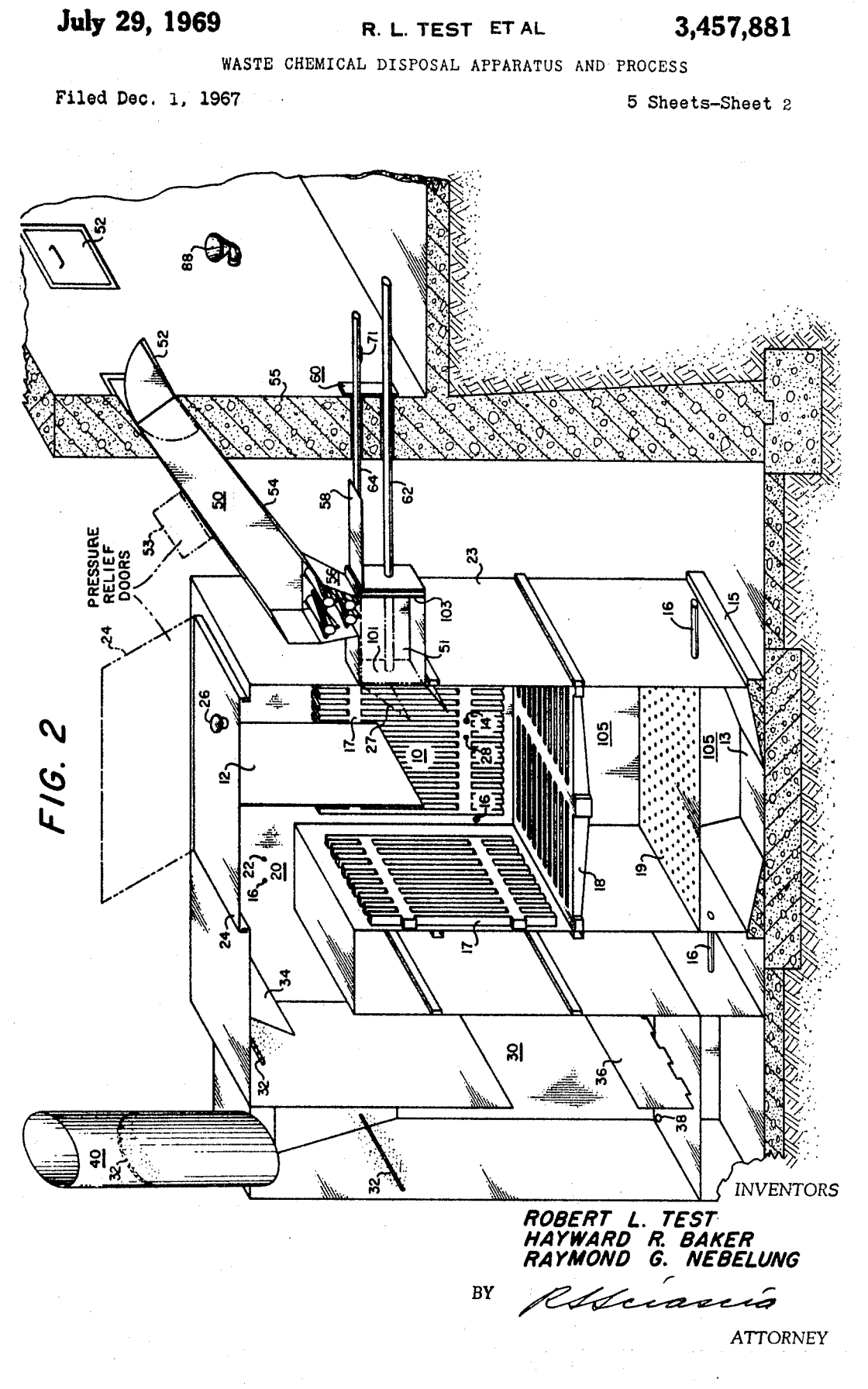

There is shown in FIG. 2 the incinerator apparatus of this invention. The apparatus consists of a concrete or other suitable explosion barrier 55 through which waste materials are charged to the incinerator material admitting means 50 and thence to the incinerator 10 where the materials are burned. Products of combustion leave the incinerator 10 and pass through an afterburner unit 20 or secondary incinerator and thence through a scrubber 30. The combustion products purified in scrubber 30 are discharged to the air through stack 40.

The incinerator 10 consists of an outer casing 23 which forms a fire box separated into three sections by a dump grate 18 and perforated base plate 19. The casing 23 is preferably made of half inch stainless steel, type 347, reinforced by channels and angles and set on a concrete base. Stainless steel serves the two-fold purpose of providing good resistance to corrosion and preventing contamination of the material of construction. Alternative casing materials are cast iron or steel or vitreous materials, such as fire brick, where chemical contamination of porous material is not an important consideration.

The upper section of the fire box is the main burning chamber and is divided by a metal flame baffle 12. The inside wall of this chamber is lined with a cast iron grating, partially shown as 17, to prevent overheating of the outer casing 23. The lining 17 is preferably attached to all four vertical walls of the main burning chamber or first section of the fire box. The first section is provided with a waste material feed opening, covered by a horizontally pivoted rotatable closure 27 fixed to one of the vertical walls of the first section.

Figure 3:
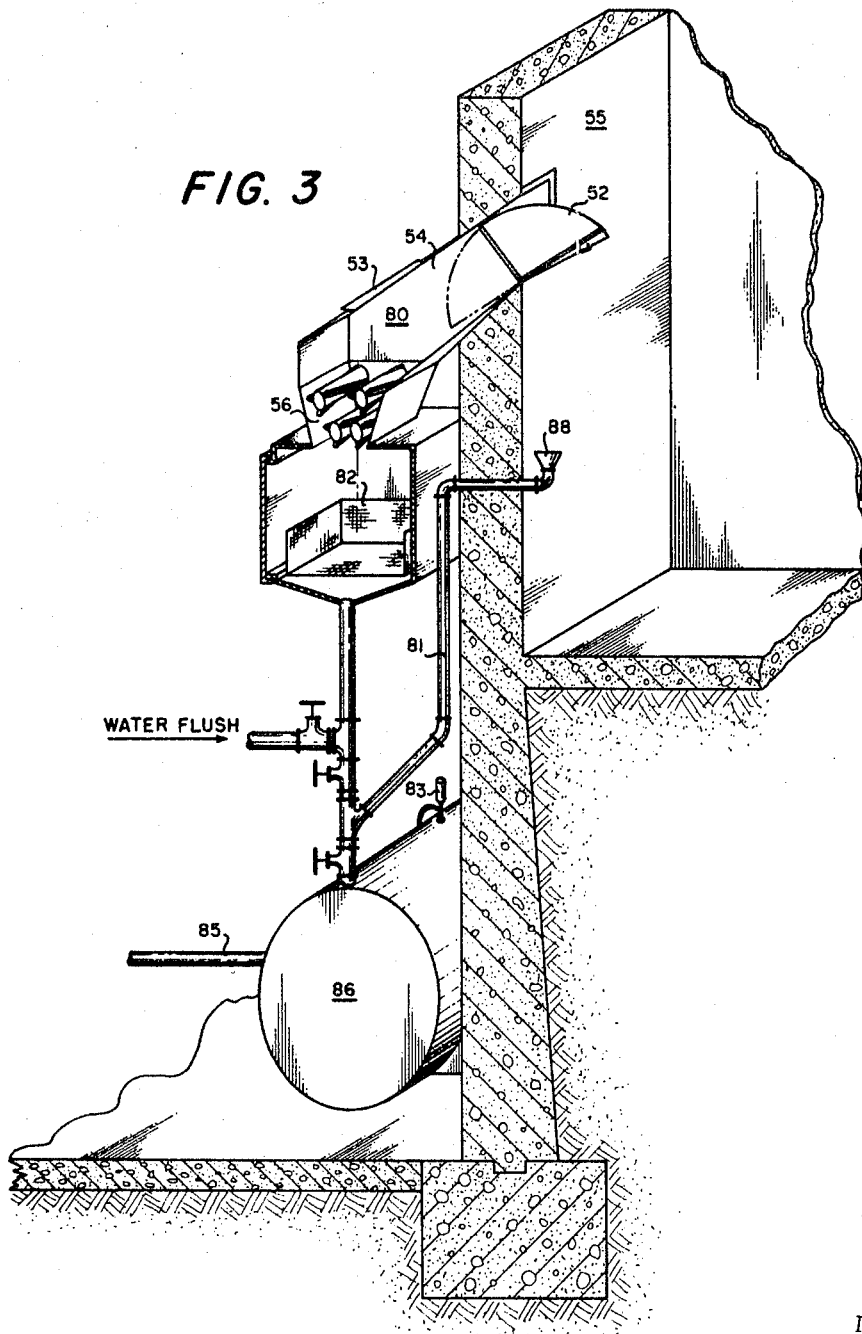
FIG. 3 illustrates a side elevation view, partially in section, of a preferred apparatus for removing liquid chemical waste from containers and collecting the waste of these containers.

The first section is provided with an inlet opening 14 for introduction of volatile combustible solvents from the solvent receiver 86 of FIG. 3. Inlet opening 28 is provided to allow gases from used cylinders of compressed gas to be introduced into the burner chamber. Spray devices may be connected to the openings, if desired, to provide more uniform distribution and burning.

Means for burning combustible materials 16 in cooperative relationship with the first section provide the necessary heat to incinerate the combustible materials introduced at 14, 28 and 52. While any oil or gas burner or its equivalent may be used it is preferred to employ propane gas burners to insure optimum combustion of waste.

A large access opening is provided at the top of the first section which serves a two-fold purpose; to allow ready access for cleanout and to provide a large opening in case of explosion. The access opening is covered with a closure 24 designed to act as an explosion relief port at a pressure of 5 p.s.i. Either a simple metal cover, hinged doors or their equivalent may be employed. The closure 24 is provided with an opening 26 which allows the incinerator to be washed down without necessitating removal of the closure 24.

Separating the main burning chamber or first section from the second section of the incinerator 10 is a dump grate 18 of conventional design constructed of cast iron or suitable equivalent. The dump grate 18 allows noncombustible materials such as glass or metal containers which are too large to pass through the openings of the grate 18 to be dropped into the second section for removal.

The middle section of the fire box, or second section, namely that area between grate 18 and base plate 19 is the debris cleanout chamber. The base plate 19 is preferably a two piece perforated stainless steel plate.

While no burning means are provided in the second section, good combustion is maintained due to the heat generated by the burner units above and below the section.

The third section of the incinerator 10, or ash pit, is that portion between the perforated base plate 19 and the incinerators concrete base 15. The concrete base 15 in addition to providing a support for the firebox enclosing incinerator 10 is sloped to the center of the furnace to provide a recessed area 13 for easy cleaning. Means for burning combustible materials 16 in cooperative relationship with the third section provide the necessary heat to incinerate materials contained in the ash pit. As previously, propane burners are preferred and are shown at 16 providing flame in a direction about perpendicular to that provided by the first section burners. (The burners are installed at opposite corners of the first and third sections of the fire box so that the incinerator contains burning means located in each of the four corners.) A cleanout door or closure 105 is provided covering part of the rear vertical side of the incinerator, to give access to the second and third incinerator sections. Either a single access door as shown, for both sections or separate closures for each may be provided. The closure may be a flat plate hinged door, or any suitable equivalent.

Material admitting means 50 is provided to prepare and admit solid combustible materials to the incinerator 10. The unit 50 consists of an inlet for admitting combustible materials covered by a suitable enclosure such as shown at 52. A loading tray closure such as that shown in FIG. 2 is preferred since when opened the tray blocks the duct leading to the incinerator protecting against explosion. The closure 52, made of any suitable corrosion resistant metal, is attached to a duct 54 which is sloped to allow material to fall into a crusher unit 56. The duct 54 is provided with an explosion relief door 53 set to open at a pressure of 5 p.s.i. The crusher unit 56 may be a hammer mill or suitable can and bottle breaker. Broken material from the crusher 56 is discharged into a collector container or receiver 51.

The receiver 51 is a metal receptacle attached to the incinerator at opening 101 of incinerator wall 23. The incinerator side of the receiver is open providing an opening through which waste is charged to the incinerator. At least a portion of the upper wall of the receiver is open and adjacent to the crusher 56 discharge.

A rod or bar 62 is inserted through an aperture in the receiver wall furthest from the incinerator. A metal pusher plate 103 is fixed to one end of the bar 62 and has the general configuration of the vertical end wall of the receiver. The pusher plate is supported by the bottom of the receiver and is free to move in a horizontal direction toward opening 101 of the incinerator wall; the pusher plate plane is maintained parallel to the incinerator wall 23 during movement.

Supported at the upper portion of the receiver is a metal shield 58 which is driven horizontally by rod 64. The shield is designed to be positioned between the crusher 56 and top surface opening of receiver 51. Any means of supporting the shield in a horizontal plane such as by metal tracks welded to the side walls of the receiver, (not shown) or the like may be used.

The bars 62 and 64 used respectively to drive the pusher plate 103 and shield 58 pass through a safety lock device 60, more fully described in FIGS. 5–8 and are driven manually by means of levers or handles (not shown).

An alternative receiver design is to provide a second container within receiver 51 instead of a pusher plate 103. The second container (not shown) would have a false bottom or no bottom at all and would be connected to rod 62. Waste entering the receiver would fall into the container. Once shield 58 were positioned to block the crusher outlet the container would be pushed horizontally into the incinerator allowing the waste to drop from the container into the incinerator. Obviously many alternative feeding means are available, the above two given as examples only.

Connected to, and in cooperative relationship with incinerator 10 is afterburner unit or secondary incinerator 20. It is fabricated from the same materials used for incinerator 10. The afterburner is provided with burning means 16, preferably a propane burner, which serves to consume flammable materials entrained in the products of combustion leaving the incinerator 10. The afterburner is also provided with means for neutralizing the acidic gaseous products 22 which result from the combustion of halogenated organic compounds and other chemicals. The means for neutralizing 22 may consist of simply an opening to allow entrance of gaseous neutralizing agents or a suitable spray nozzle to provide a fine spray or fog of a liquid neutralizing agent. Ammonia is a preferred neutralizer.

Connected to the afterburner 20 in a cooperative relationship therewith is a scrubber unit 30. The scrubber is made of corrosion resistant metal, for example, stainless steel or the like. Scrubber 30 is provided with one or more spray nozzles 32 which provide a fine spray or fog of water within the scrubber. The scrubber is divided into two or more sections by suitable baffles; one extending vertically from the roof, shown as 34, and a perforated baffle extending from the scrubber floor shown as 36. Gaseous products of combustion entering the scrubber unit are contacted by a water spray or fog which removes entrained solid materials and water soluble products contained in the gas. Water from the spray is collected at the bottom of the chamber, exits through opening 38 and flows to the liquid effluent system shown in FIG. 4.

Products of combustion leaving scrubber 30 are passed to the atmosphere through metal or corrosion resistant brick stack 40. The stack is provided with one or more water sprays or fog nozzles, shown as 32, to minimize the quantity of entrained solid material discharged to the atmosphere.

The preferred location of the incinerator burners to provide optimum waste combustion is two burners located approximately one foot above grate level, in opposite corners of the first section of the incinerator, with the flames concentrated toward the center of the first section. An additional two gas burners are located directly below the perforated plate in the third section or ash pit in opposite corners from the first section burners to insure complete combustion of residual material entering the second and third incinerator sections. One burner is located in the secondary incinerator unit to insure combustion of all material discharging to the air.

Now referring to FIG. 3, there is shown a waste liquid unit 80, used to remove liquid products from their containers. Containers of organic waste laboratory liquids are charged to the crusher unit 80 through a concrete barrier 55 by opening the rotatable closure 52 and depositing the containers therein. Closure 52 acts as a tray when open and a door when closed. The containers proceed down a metal duct 54 into crusher unit 56 which may be the same type as that employed in FIG. 2. The duct is provided with an explosion relief door 53. The containers are broken on passing through the crushing rolls or knives of crusher 56 (depending on the grinder employed). Solid container material is collected in receiver 82 while liquid contents pass through the perforated bottom of the receiver to a waste liquid collection tank 86. There is also provided a receiver 88 connected by suitable piping 81 to tank 86 which allows larger volumes of waste liquid to be discharged directly into the collection tank. Liquids stored in collection tank 86 are disposed of by pressurizing the tank with a suitable inert gas, for example, nitrogen. Liquid is forced through suitable metal or plastic line to opening 14 of incinerator 10. Gas for pressurizing tank 86 is supplied by line 85. The tank is provided with a pressure relief valve 83 to prevent excessive building of pressure. Manual or automatic pressure regulators (not shown) may be employed to regulate the tank pressure and hence the flow of waste liquid to the incinerator.

Solid materials collected by the receiver 82 are disposed of by automatic conveyor transfer or by manual transfer to the material admitting means 50 (shown in FIG. 2) of the incinerator.

Figure 4:
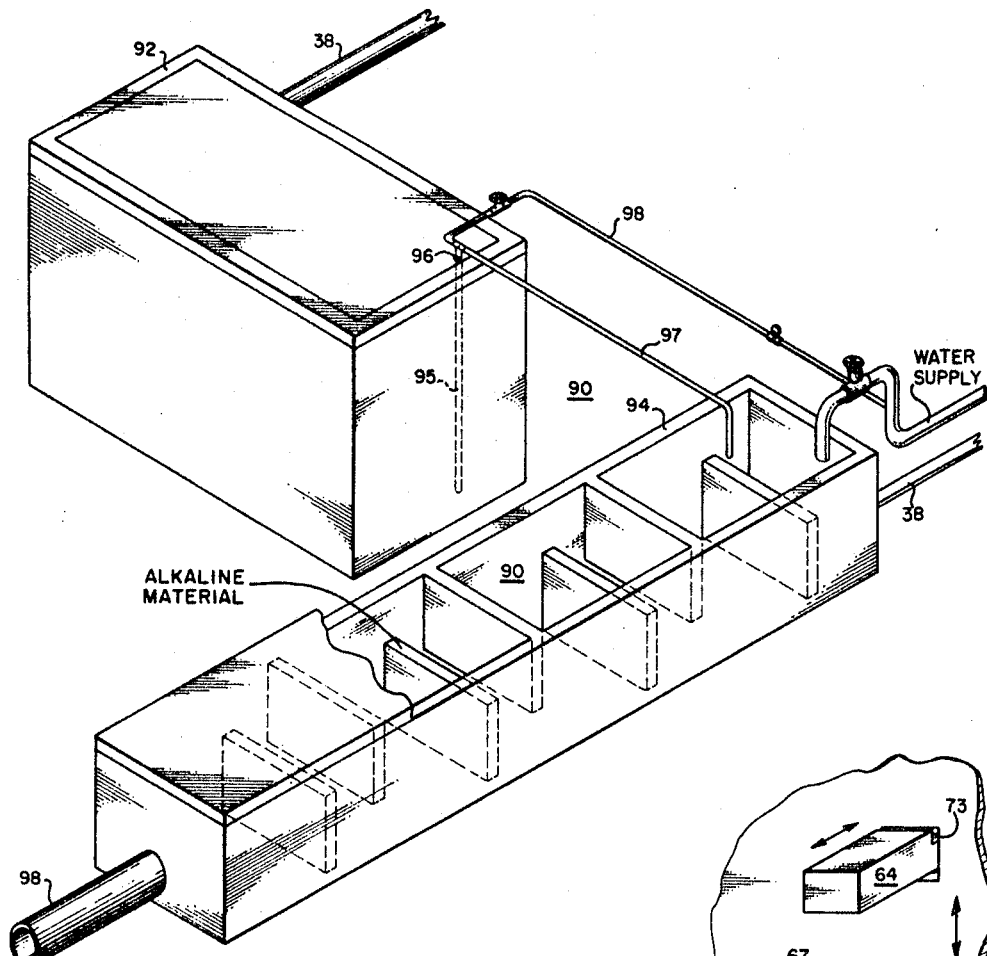
FIG. 4 is a diagrammatic view, partially in top plan, of the liquid effluent treatment system of this invention.

Referring now to FIG. 4 there is shown a liquid effluent system 90 used to dilute and neutralize all liquid waste before discharge to sewers or waterways. The liquid effluent system 90 consists of steel, cement or other holding tank 92 wherein water from the scrubber unit 30 of FIG. 1 and other liquids, for example, wash water from cleanup, is stored. The holding tank 92 is provided with an ejector 96 connected to a water supply line 98 which meters a controlled quantity of the liquid stored in the holding tank to the dilution box 94 through pipe line 97. Waste liquid from the holding tank 92, diluted with fresh water in the dilution box 94 which is made of concrete or other suitable materials, is discharged to the sewer through line 98. At least a portion of the chambers of dilution box 94 contain a source of alkaline material, for example calcium carbonate, limestone or the like, so that acid waste liquid passing through the dilution box is neutralized before discharge to the sewer. The dilution box is also provided with an inlet 38, from the scrubber unit, so that where desired the holding tank 92 may be bypassed.

Referring now to FIGS. 5, 6 and 7 there is shown, in front side and top view respectively, the preferred safety locking device of this invention. The safety locking device 60 consists of a back plate 72 suitably adapted to be affixed to the concrete barrier 55 of FIG. 2. Fixedly attached to the back plate 72 is a rectangular housing 69 having a front plate, two side plates and two end plates. Attached to each side plate are metal bars 65 in spaced relationship with each other and extending the length of the side plates.

Within the closure formed by the back plate 72 and housing 73 is a locking plate 67 maintained in movable position between the metal bars 65 on both side plates and in spaced relationship with the front and back plates.

One end of the locking plate 67 is cut so that there are two elongated protrusions 97 toward the outer edge of the locking plate and one central protrusion 93 spaced between the outer two. Washers 63 inserted over the outer protrusions 97 are supported by spring means 61 between the bottom plate and the washers. The springs normally maintain the backing plate in raised position out of contact with microswitch 68.

The locking plate 67 is slotted with bars 62 and 64 passing through respective slots orthogonally to the plane of the locking plate. The bar 62 has a recessed seat 73 designed to receive the locking plate 67 when out of contact with the microswitch 68. The bar 64 has a chamferred shoulder 71 designed to force the locking plate away from the recessed seat of bar 62 and compress the spring means 61 so that the microswitch 68 is contacted.

In operation rod 64 is moved to position shield 58 between the container 51 and the crusher 56 while shoulder 71 forces the plate 67 against the microswitch 68 cutting off the crusher power. Rod 62, now free to move, is pushed in toward the incinerator so that waste may be charged through closure 27. Rod 62 is then repositioned so that the locking plate is again in position to contact the recessed seat 73. Rod 64 is next repositioned and the grinder restarted. Because of the unique safety lock design the bars can only operate in the sequence of movement of bars 64, 62, 62, 64 insuring that the incinerator may never be charged without the cover plate 58 blocking the crusher outlet nor may the cover plate 58 be removed to allow filling receptacle 51 without the receptacle being in position to collect waste.

Figure 8:
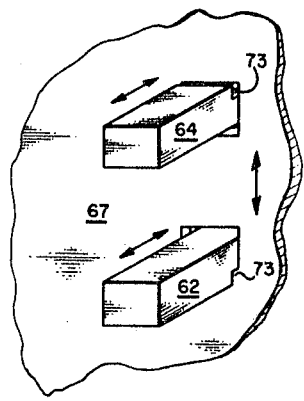
FIG. 8 is a partial side elevation view of another embodiment showing the means for positioning each bar, of the safety interlock device, in a predetermined sequence.

Referring now to FIG. 8 there is shown a partial side elevation view of means for positioning each bar of the safety interlock device in a predetermined sequence. This is an alternative to the means shown in FIG. 6. Bars 62 and 64 are shown with slots 73 on opposite sides of the bars to provide a maximum distance between the slots. The bars 62 and 64 are inserted into a locking plate 67, through openings of the same configuration although slightly larger than the bars, so that one bar 62 is held fixedly in position by the locking plate, within the bar slot 73, while the other bar 64 is free to move in a direction perpendicular to the locking plate.

By moving the locking plate, say manually, in a downward direction, as shown in FIG. 8, the bar 62 is freed to move while bar 64 is maintained in a fixed position.

The alternative positioning means insures a fixed sequence of bar operation since neither bar can move without the locking plate positioned in the slot of one of the two bars.

The process and apparatus of this invention provide for complete and safe disposal of laboratory chemical waste without environmental contamination. Flammable and toxic chemicals in solid, liquid or gaseous form are treated primarily by incineration with neutralization facilities used to treat all liquid waste and all gaseous waste before discharge to the environment.

A novel safety locking device is also disclosed to prevent backflow of fumes and vapors from the incinerator.

Obviously many modifications and variations of the present invention are possible in the light of the above teachings. It is therefore to be understood that within the scope of the appended claims the invention may be practiced otherwise than as specifically described.

What is claimed is:

1. An incinerator for disposal of waste materials including volatile toxic chemicals in solid, liquid and/or gaseous form comprising:
    an outer casing forming a firebox for receiving materials to be burned, said firebox including three primary incineration compartments;
    explosion pressure releasing means included in said casing;
    means in said casing for conducting products of combustion away from said firebox;
    the first of said incineration compartments being located in the uppermost portion of said firebox and having vertical sidewalls;
    a metal grating fixed to a portion of the said vertical walls;
    means for admitting materials to be burned to said first compartment;
    means in cooperative relationship with said first compartment for burning materials admitted therein;
    the second compartment of said firebox being located subjacent to said first compartment;
    a dump grate between said first and second compartments;
    a closure removably fixed to said second compartment for discharging debris therefrom;
    the third compartment of said firebox being located subjacent to said second compartment;
    a perforated base plate between said second and third compartments;
    a closure removably fixed to said third compartment for discharging debris therefrom; and
    means in cooperative combustion relationship with said third compartment for combustion of residual burnable materials dropping therein through said perforated base plate.

2. The incinerator of claim 1 in which the means for conducting products of combustion away from said firebox includes a secondary incineration chamber having means for burning soot and other carbonaceous materials and means for neutralizing the acidity of the products of combustion.

3. The incinerator of claim 2 further including a scrubber unit attached to and operatively associated with said secondary incinerator chamber to further purify the discharging gases by removing materials soluble in the scrubber liquid contacting said gases.

4. The incinerator of claim 3 further including a stack with one or more water sprays to further purify the gases discharged by said products conducting means.

5. The incinerator of claim 4 in combination with a waste liquid unit for safe removal of the liquid contents of waste containers, said liquid unit comprising:
    a container crusher for rupturing containers and discharging their contents;
    a perforated receiver proximate to the crusher discharge for retaining the containers while allowing said container contents to pass through the perforations;
    means for removing the containers from the crusher unit;
    a collection tank cooperatively associated with said receiver for collecting container contents passing through the perforation; and
    means for transferring liquid and solid waste from said crusher unit to said incinerator.

6. The incinerator of claim 4 in combination with a liquid effluent system for diluting and neutralizing liquid waste prior to discharge to waterways, said system comprising:
    a holding tank;
    a dilution box having a plurality of chambers, at least one chamber containing an alkaline material for neutralizing acid substances contained in the waste; and
    means metering waste from the holding tank to the dilution box.

7. The incinerator of claim 4 in which said material admitting means includes:
    a crusher for removing the contents of waste chemical containers;
    a receiver in cooperative relationship with the crusher and operative to collect waste material discharging from the crusher and to convey said waste to the incinerator, and
    a movable metal shield disposed between the crusher and the receiver for preventing explosive destruction of the crusher while waste is charged to the incinerator.

8. The incinerator of claim 7 which further includes safety locking means for predeterminately controlling the sequence for discharging the waste receiver and for movement of the crusher shield to allow the incinerator to be charged with waste only when the shield covers and protects the outlet of the crusher and to allow the receiver to be filled with waste only when the shield is removed from the crusher outlet.

9. The incinerator of claim 8 wherein said safety locking device is in operative relationship with said receiver and said movable metal shield and comprising:

a movably supported locking plate having a pair of apertures formed therein;

a first movable bar supported through one of said apertures and operative in one position to discharge the waste from said receiver into said incinerator;

a second movable bar supported through the other of said apertures and coupled to drive said movable metal shield; and positioning means for preventing movement of said first bar to said one position until said second bar has driven said metal shield to a position to block said crusher from discharging into said receiver.

10. The incinerator of claim 9 in which the positioning means comprises:

a slot in each bar cut by a plane orthogonal to the bars axis;

each slot being positioned to provide maximum distance between the slots; and at least a portion of said locking plate is maintained within at least one slot at all times.

11. The incinerator of claim 9 in which the positioning means comprises:

a chamfered shoulder on said second bar;

a recessed slot on said first bar; and spring means to maintain the locking plate in contact with at least one of the bars.

12. The incinerator of claim 11 which further includes a microswitch operable when said spring means is compressed.

References Cited

UNITED STATES PATENTS

| | | | |
|---|---|---|---|
| 954,855 | 4/1910 | Decarie | 110—17 X |
| 1,069,577 | 8/1913 | Prescott | 110—8 |
| 1,877,214 | 9/1932 | Woodman | 110—17 X |
| 2,171,535 | 9/1939 | Berg et al. | 110—8 |
| 3,173,389 | 3/1965 | Cates et al. | 110—14 |
| 3,357,380 | 12/1967 | Siracosa | 110—8 |

JAMES W. WESTHAVER, Primary Examiner

U.S. Cl. X.R.

110—18, 173; 214—18